Figure 1:
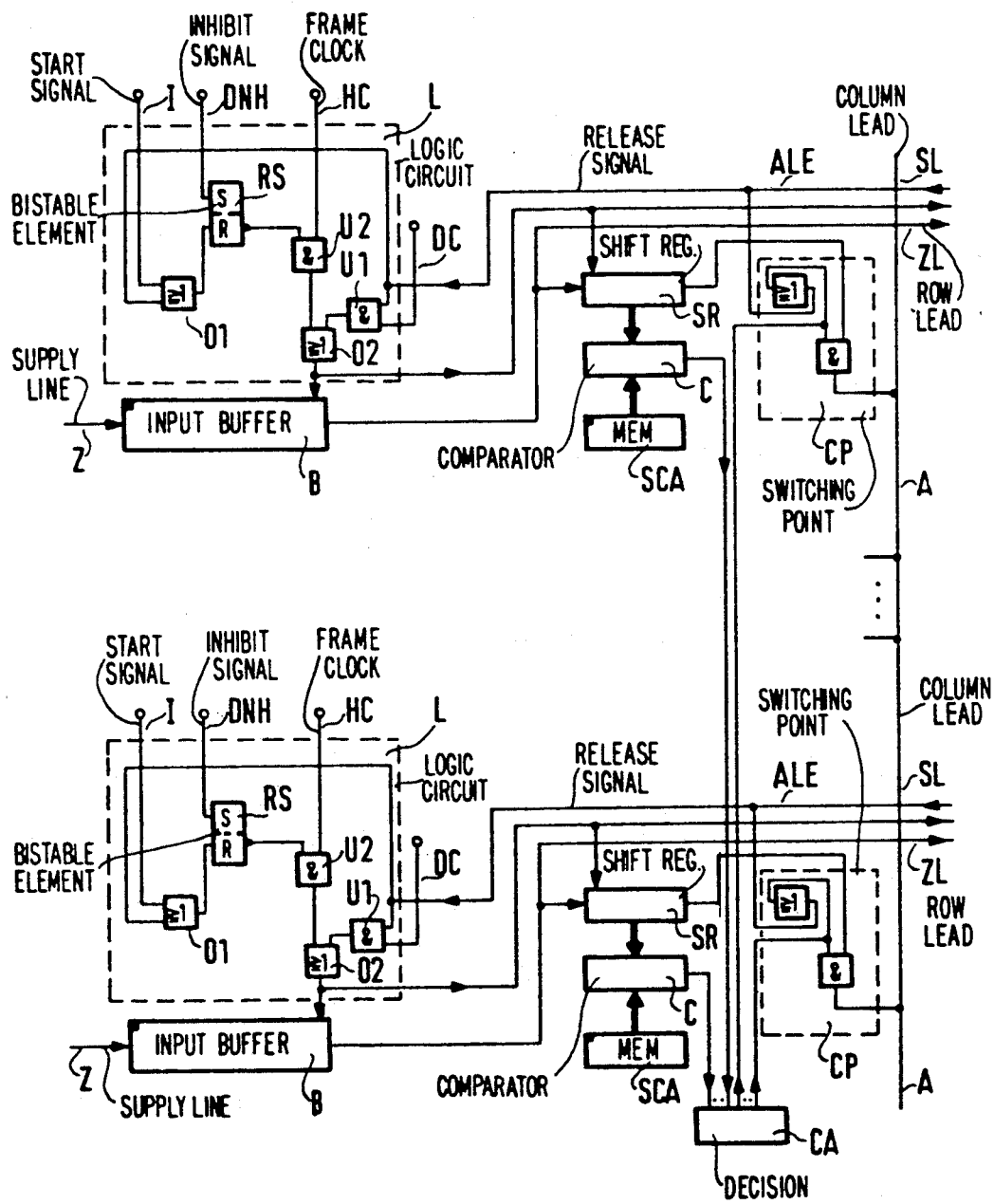

United States Patent [19]

Killat et al.

[11] Patent Number: 5,128,927
[45] Date of Patent: Jul. 7, 1992

[54] SWITCHING NETWORK AND SWITCHING NETWORK CONTROL FOR A TRANSMISSION SYSTEM

[75] Inventors: Ulrich R. P. Killat, Hamburg; Johann E. W. Krüger, Quickborn, both of Fed. Rep. of Germany

[73] Assignee: U.S. Philips Corporation, New York, N.Y.

[21] Appl. No.: 518,889

[22] Filed: May 4, 1990

Related U.S. Application Data

[63] Continuation of Ser. No. 283,419, Dec. 12, 1988, abandoned.

[30] Foreign Application Priority Data

Dec. 23, 1987 [DE] Fed. Rep. of Germany ....... 3743685

[51] Int. Cl.⁵ .............................................. H04Q 11/04
[52] U.S. Cl. .................................... 370/56; 370/58.1; 370/60
[58] Field of Search ................. 370/60, 94.1, 56, 58.1, 370/58.2, 58.3, 60.1, 53

[56] References Cited

U.S. PATENT DOCUMENTS

| | | | |
|---|---|---|---|
| 4,577,311 | 3/1986 | Duquesné et al. | 370/60 |
| 4,603,416 | 7/1986 | Servel et al. | 370/60 |
| 4,630,259 | 12/1986 | McMillen et al. | 370/60 |
| 4,692,917 | 9/1987 | Fujioka | 370/60 |
| 4,731,878 | 3/1988 | Vaidya | 455/600 |
| 4,760,570 | 7/1988 | Acampora et al. | 370/60 |
| 4,780,870 | 10/1988 | McHarg et al. | 370/60 |
| 4,796,254 | 1/1989 | Van Baardwijk et al. | 370/58 |

FOREIGN PATENT DOCUMENTS

0183592 6/1986 European Pat. Off. .............. 370/60

OTHER PUBLICATIONS

Killat, "Asynchrone Zeitvielfachübermittlung für Breitbandnetze", ntz B0.40 (1987) Heft 8 pp. 572-577.
Katevenis, "Fast Switching and Fair Control of Congested Flow in Broadband Networks", IEEE J. Sel. Areas Comm. vol. SAC-5, No. 8, 1987 pp. 1315-1326.
Y. S. Yeh, et al. "A Simple Knockout Switch . . . ", IEEE J on Sel. Areas Comm., vol. SAC-5, No. 8, Oct. 1987 pp. 1274-1283.

Primary Examiner—Douglas W. Olms
Assistant Examiner—Alpus H. Hsu
Attorney, Agent, or Firm—Anne E. Barschall

[57] ABSTRACT

In the framework of the development of future, integrated wideband networks, specifically the arrangement of the switching networks and switching network controls is of particular importance.

In a switching network arranged in accordance with a space-division multiplex switching network each switching point comprises a comparator, comparing the addresses of the trunk lines arranged column-by-column to the routing information. When there is multiple correspondence in a column a decision circuit assigned to the trunk line decides the order in which the switching points are to switch. In addition, an input buffer is connected to each supply line, in which buffer the blocks are temporatily stored until they can reach one of the trunk lines. To avoid the occurrence of bottle-necks in the performance of the switching network an input buffer is assigned to each switching point or the switching network is arranged column-by-column and built up of units of equal structure.

3 Claims, 5 Drawing Sheets

SWITCHING NETWORK AND SWITCHING NETWORK CONTROL FOR A TRANSMISSION SYSTEM

This is a continuation application Ser. No. 283,419, filed Dec. 12, 1988, now abandoned The invention relates to a switching network and a switching network control for a transmission system in which blocks are transferred according to a time-division multiplex method, specifically an asynchronous time-division multiplex method, and are switched through the transmission system on the basis of the routing information contained in the headers of the blocks.

In communication networks the portion of the data to be transferred is ever increasing. To cope with the data traffic, switching systems have been arranged separately for the data traffic and telephone traffic. Since the data rate of the data signals to be transferred can assume a multiplicity of different values, it is difficult to combine data and telephone switching in one network node.

In the scope of the development of future, integrated wideband networks, discussions are being held as to which method the digital or analog information—partly requiring a large bandwidth—is to be transmitted in digital networks. Packet switching, in which the (digital) messages are segmented into packets, have been known for a long time. Each packet contains extra information in addition to the useful information; among other things indications about the destination (address). On the basis of their packet addresses the messages consequently are conveyed to the partner sharing the connection, which requires transmission capacity only when a message is actually to be transmitted.

Furthermore, circuit switching has been known for a long time, which requires transmission capacity for the total duration of the connection, irrespective of the fact whether messages are actually being transmitted or not. Specifically in the telephone network two-way transmission paths are made available, although in general only one of the two telephone subscribers is speaking.

So far, the implementation of packet switching in data traffic has led to transfer rates of the order of 100 packets per second and over. For future services that implement the method of packet switching, for example in picture communication, a thousand times this number is anticipated. In order to attain such transfer rates, the time consuming operation of logging is separated from the actual switching process in the case of Fast Packet Switching, and the packets are divided over the transmission links according to their destination addresses. Highly simplified logging that allows rapid evaluation is used to accelerate the switching process and the switching networks. At the input of the switching node the arriving data packets are processed in a decentralized manner, as they contain internal addressing information which is in accordance with their destination, switched through the central switching network and then transferred at the output without the internal addressing information.

Embodiments for the "Fast Packet Switching" are "Asynchronous Time Division" and "Frame Relaying". With respect to the transfer mode, a distinction is made between "Synchronous Transfer Mode" and "Asynchronous Transfer Mode" as well as the mixing from "Hybrid Configurations". In the Synchronous Transfer Mode, a specific transmission channel is identified only on account of its distance in time from a synchronizing word. In the Asynchronous Transfer Mode each channel is identified by the addresses (headers) of its packets (blocks), especially the beginnings of the blocks can be recognized, so that the headers can be evaluated. Flags or an inferior synchronous structure are used supposing a constant block length. An example thereof is "Asynchronous Time Division", in which synchronizing words are repeatedly blended into the bit stream as "empty blocks".

Especially hybrid configurations with a combination of Synchronous Transfer Mode and Asynchronous Transfer Mode might gain practical importance, because the network user wishes to continue to use the already existing networks arranged in the Synchronous Transfer Mode as long as possible on account of the high amount of the investment costs.

In the European Patent Specification No. 0 183 592 a wideband transmission system has been proposed, in which the message is segmented into blocks (cells) and transmitted through wideband transmission links according to an asynchronous time-division multiplex method. The blocks (cells) can have the same or different lengths. The blocks comprise useful as well as address information, whereas the address information is accommodated in a so-called header. The number of bits of a block is designated as the block length, whereas the standardization proposals in this context provide values between 120 and 256 bits for the useful information and 32 or 16 bits for the header. The time intervals, in which the blocks are transmitted, are designated as frames. A frame can comprise a valid block or be empty. Between two subscribers of the wideband transmission system there is a virtual connection which is maintained in that the blocks transmitted from the subscriber stations are provided with unique header codes, which allow the switching nodes to convey the blocks correctly. The blocks arriving at the switching node of an incoming line are transferred onto an outgoing line after a conversion of the header. Since two or a plurality of blocks may arrive for the same outgoing line during one frame, so-called queue buffers are to be provided in the switching node. In the queue buffer one or a plurality of these blocks are temporarily stored until an empty frame is available for them.

The switching nodes can be centrally buffered systems (for example, known from the European Patent Specification No. 0 183 592) or decentrally buffered systems. In centrally buffered systems there is only one buffer, to which each incoming line delivers its arriving blocks and which is read again for these blocks by each outgoing line. Systems having a decentralized buffering are further distinguished by whether a buffering of blocks takes place only on the input side (an embodiment thereof is described in the not prepublished German Patent Application with the official file reference P 37 14 385.9 which corresponds to U.S. application Ser. No. 07/189,275 which is incorporated herein by reference) or whether the buffers are exclusively arranged for the outgoing lines (compare, for example, IEEE, B 10.2.1, 1987, "The Knock-out Switch: A Simple, Modular Architecture for High-Performance Packet Switching" by J. S. Yeh et al) or whether systems have input and output buffering. In this connection, the term of Switching Network Buffering is also used when a buffer is assigned to each switching point of a switching matrix.

As shown in the above embodiments, the arrangement of the switching network requires extensive investigations and careful consideration for a switching node of a wideband transmission system, in order to take account of the multifarious dependence and mutual influences. In addition, it should be observed that the switching technique for the switching networks under discussion verges on the limits of the present semi-conductor switch times. Bottle-necks in the performance can occur when various blocks are simultaneously transferred through the switching network of an exchange. The blocks can influence each other when in the switching network only few links are available as necessary links. Two types of influencing are especially important in this connection: the conflict and the obstruction.

Two blocks (or the circuits transferring them) are in a mutually conflicting situation, when for the transmission the same circuit components are to be used. As a rule, one of the blocks will have priority over the other, and the other block either is to wait or be lost.

In case of obstruction, a block V is to wait for the processing of a block U, whereas simultaneously, however, U is not processed because there is a conflicting situation between block U and a third block W. Consequently, a normal queueing situation in a queue buffer is no objection, as long as the first block in the buffer is transferred at each frame clock. Only when this buffer is in a conflicting situation and is not served, as a result of which, however, no other block can be simultaneously transferred in this queue buffer, will there be an obstruction.

The idea of obstruction is important for the evaluation of the performance of such systems. Because, when a queue buffer which is not empty cannot be finished during a frame period, one can imagine that an additional "virtual" block will be processed instead. The sum of the virtual and real load is then the overall load of the system. The virtual load in several switching networks can nearly become as large as the real load. This is especially true for the switching networks utilizing input buffering.

In FIG. 1 is represented a switching network having input buffering, which is described in the not pre-published German Patent Application having the official file reference P 37 14 385.9. The description of this prior German Patent Application is particularly referenced to in this context.

From the highway system with supply lines Z and trunk lines A a switching network is structured in the form of a space-division multiplex switching network. Each switching point CP comprises its own evaluation logic for the information contained in the header. The blocks supplied through the supply line Z are accepted on the input side to an input buffer B in the switching network. The frames received from the subscriber or the preceding switching node are right-aligned in the input buffer B. By means of a comparator C assigned to each switching point CP the addresses of the trunk lines A arranged column-by-column, which addresses are stored in the memory SCA, are compared to the routing information contained in the header. To each of the trunk lines A a decision circuit CA is assigned, which determines the order in which the supply lines Z arranged line-by-line are to be switched in the case of equal routing messages. The order is determined by the spatial arrangement of the supply lines Z, whereas each decision circuit CA cyclically queries all its assigned comparators C.

A number of shift registers SR corresponding with the number of trunk lines A is connected to an input buffer B, in which registers the routing information is stored. Each shift register SR is connected to the switching point CP and also to the comparator C. The activating input of the assigned switching point is connected to the comparator C through the decision circuit CA. The decision circuit CA controls, by means of a signal provided by a logic circuit L, the acceptance of a new routing message by the shift register SR. The signal is released by a release signal ALE applied to the logic circuit L.

The logic circuit L connected to the input buffer B comprises a first AND gate U1 and a first OR gate O1. The first input of the first AND gate U1 and of the first OR gate O1 of the logic circuit L is connected to the decision circuit CA. A start signal I produced in the switching node is applied to the second input of the first OR gate O1, whose output is connected to a reset input R of a bistable element RS. A data clock signal DC produced in the switching node is applied to the second input of the first AND gate U1, whose output is connected to the first input of a second OR gate O2. The inverting output of the bistable element RS is connected to a first input of a second AND gate U2, at whose second input a frame clock signal HC is present produced in the switching node. The output of the second AND gate U2 is connected to the second output of the second OR gate, whose output is connected to the input buffer B as well as the shift register SR. An inhibit signal DNH derived in the switching node from the frame clock signal HC is present at the set input S of the bistable element RS.

When the bistable element RS produces a switching signal at the inverting output and the frame clock signal HC is present at the second input of the second AND gate U2, the header of the first frame in the input buffer B is read into the shift register SR. The comparator C compares the routing information contained in the header to the addresses of the trunk lines A arranged column-by-column contained in the memory SCA.

In the case of correspondence the comparator C applies a signal to the decision circuit CA and, on the basis of the received signals, this decision circuit CA determines the order of the supply lines Z, arranged line-by-line which are to be switched. For this purpose the decision circuit CA applies the release signal ALE to the input buffer B and switches the selected switching point CP through. With the aid of the data clock signal DC the data D are switched through the switching point CP onto the trunk line.

For the case in which no routing information is contained in the header, the routing information stored in the shift register SR is not transferred to the trunk line A.

So, the P 37 14 385.9 describes a switching arrangement according to the principle of the asynchronous time-division multiplex method, which is arranged according to a space division multiplex switching network. Each switching point CP comprises a comparator C, which compares the address of the trunk line A, arranged column-by-column, to the routing information. When there is multiple correspondence in one column, a decision circuit CA assigned to the trunk line A determines the order in which the switching points are to switch (FIG. 1).

For this purpose an input buffer B is connected to each supply line Z in which buffer the blocks are temporarily stored until they reach one of the trunk lines A.

As shown by extensive experiments, high loads may lead to buffer overflow. This will be explained hereinafter while reference is made to FIG. 2a for the sake of completeness. The case will be considered of an access conflict of a number of n supply lines Z and one trunk line $A_i$. The decision circuit CA determines in which order the first blocks of the n input buffers B concerned reach the trunk line $A_i$. There is one input buffer $B_k$ (supply line Zk) having the longest queue time: here the first block $P_{1k}$ is to wait in the input buffer $B_k$ for $(n-1)$ block transfer times, until it reaches the line $A_i$. The second block $P_{2k}$ is to wait in this input buffer $B_k$ for n block transfer periods until it reaches its desired output line $A_j$. This queue time specifically occurs when the output line $A_j$ was free for the duration of n block transfer periods. In this example it will become evident that free channel capacities remain unused, which is then clearly noticeable at high loads.

The invention has for its object to provide a switching network as well as a switching network control for a transmission system such that the occurrence of bottle-necks in the performance of the switching network is largely avoided.

This object is accomplished according to the invention by a switching network characterized in that the switching network is composed of units (BE) of equal structure according to a space-division multiplex switching network, which units each have a column of switching points (CP) with assigned comparators (C), input buffers (B), decision circuits (CA) and clock signal control circuits (T), in that one interface circuit (JM) is connected to each supply line (Zl, . . . ,Zm), in which interface circuit the blocks are temporarily stored, frame-synchronized and subjected to a serial-to-parallel conversion and which is connected to a bus-like cabling and in that the bus-like cabling is connected to the units (BE).

Such a switching network is advantageous in that no rather large delays occur when the blocks are switched through the switching network and conflicts are largely avoided.

A switching network control according to the invention is characterized in that in a highway system structured according to a space-division multiplex switching network a number of input buffers (B) corresponding with the number of trunk lines (A) are connected to each supply line (Z), in which input buffers the applied blocks are temporarily stored, in that a shift register (SR), in which the routing information is stored, is connected to the input buffers (B), and in that each shift register (SR) is connected to the switching point (CP) and also to a comparator (C) assigned to the switching point (CP), which comparator compares the addresses of the trunk lines (A) arranged column-by-column to the routing information. Such a control largely avoids the disadvantages depicted above, because an input buffer is assigned to each switching point. In the situation described with reference to FIG. 2b the input buffers $B_{ik}$ and $B_{jk}$ both contain the blocks $P_{1k}$ and $P_{2k}$. The block $P_{2k}$ intended for the line $A_j$ is to wait for only one block transfer period before it can arrive at the free line $A_j$, irrespective of the type of access conflict on the line $A_i$.

The invention will be further described and explained with reference to various embodiments shown in the drawing Figures, in which:

FIG. 1 shows an embodiment for a switching network having input buffering.

Figure 2A:
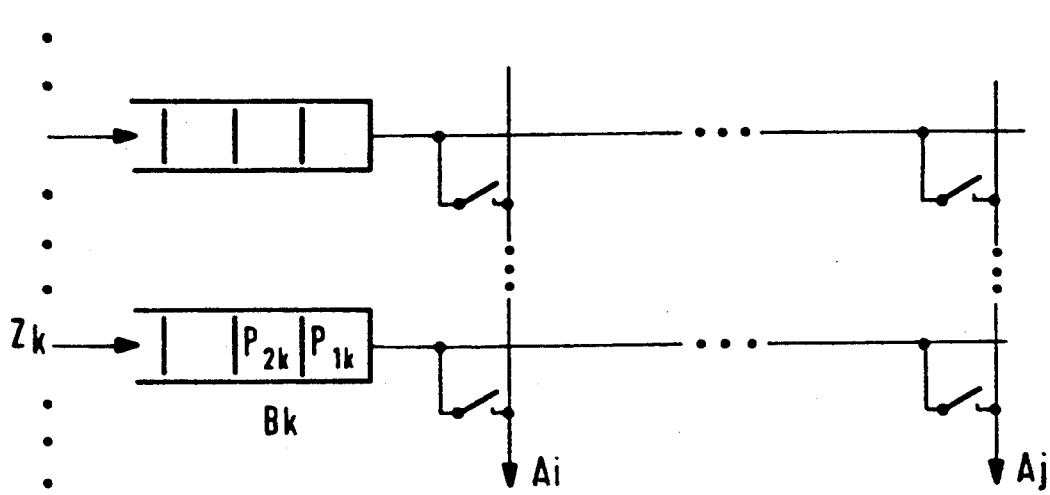
Figure 2B:
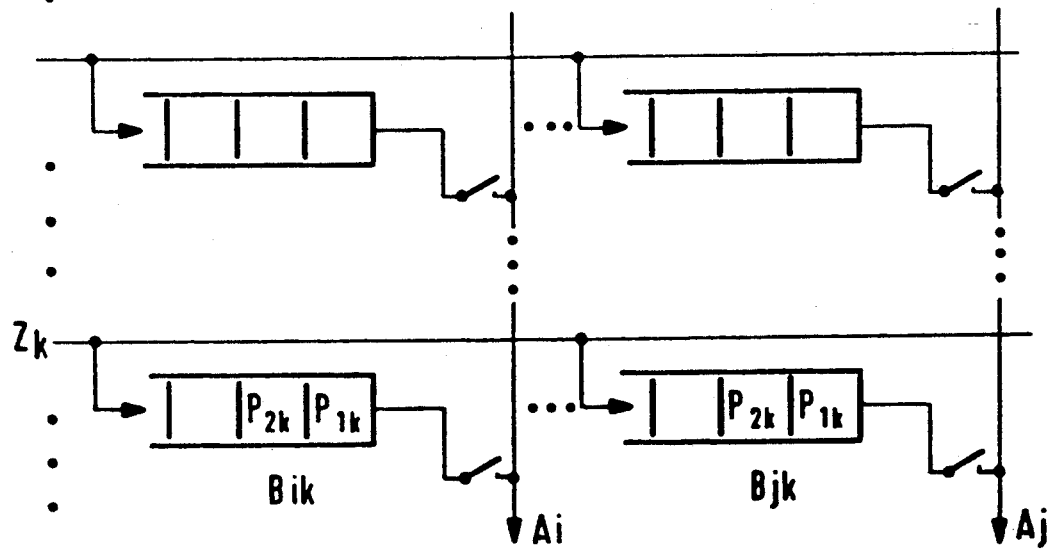
Figure 3:
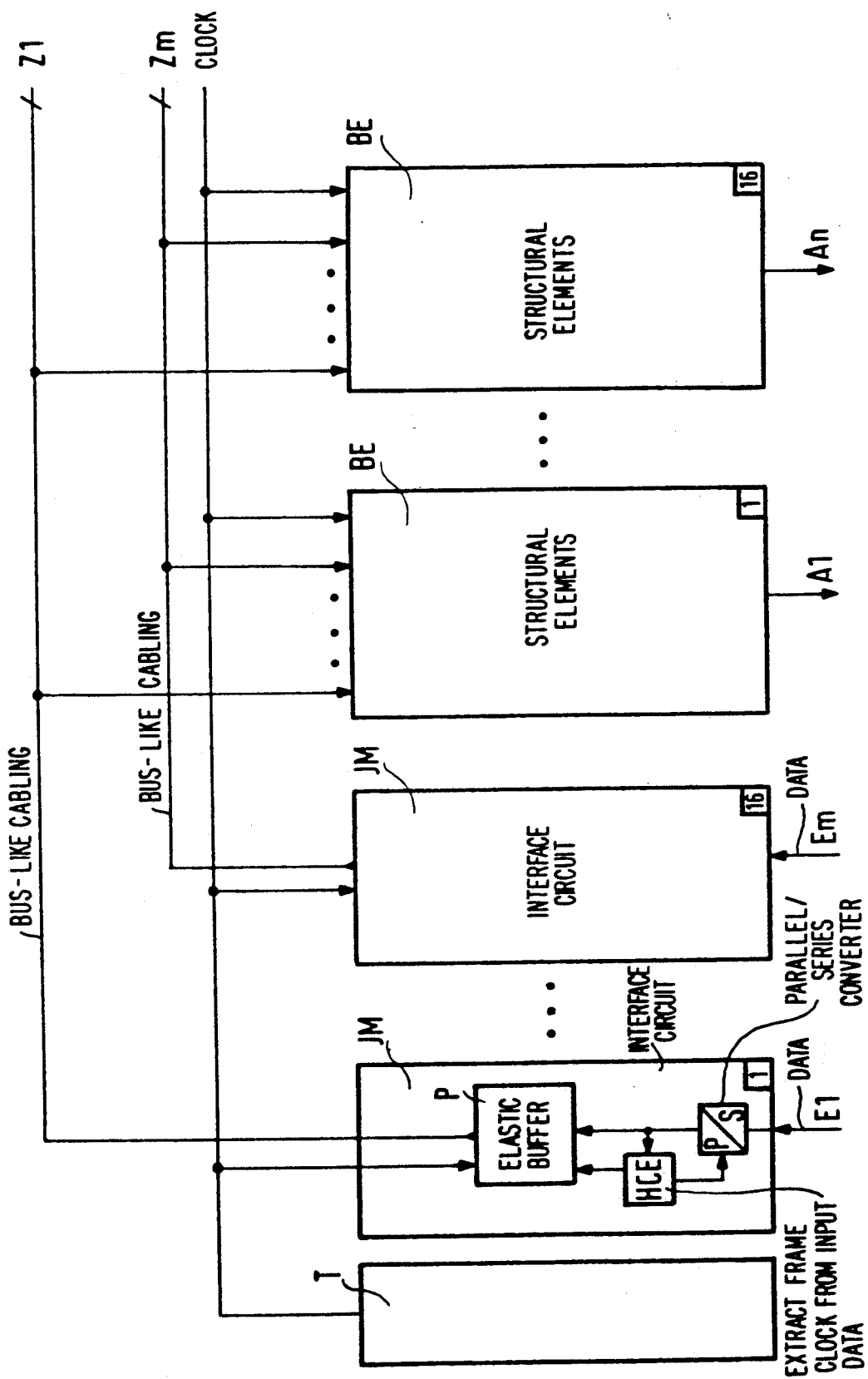
Figure 4:
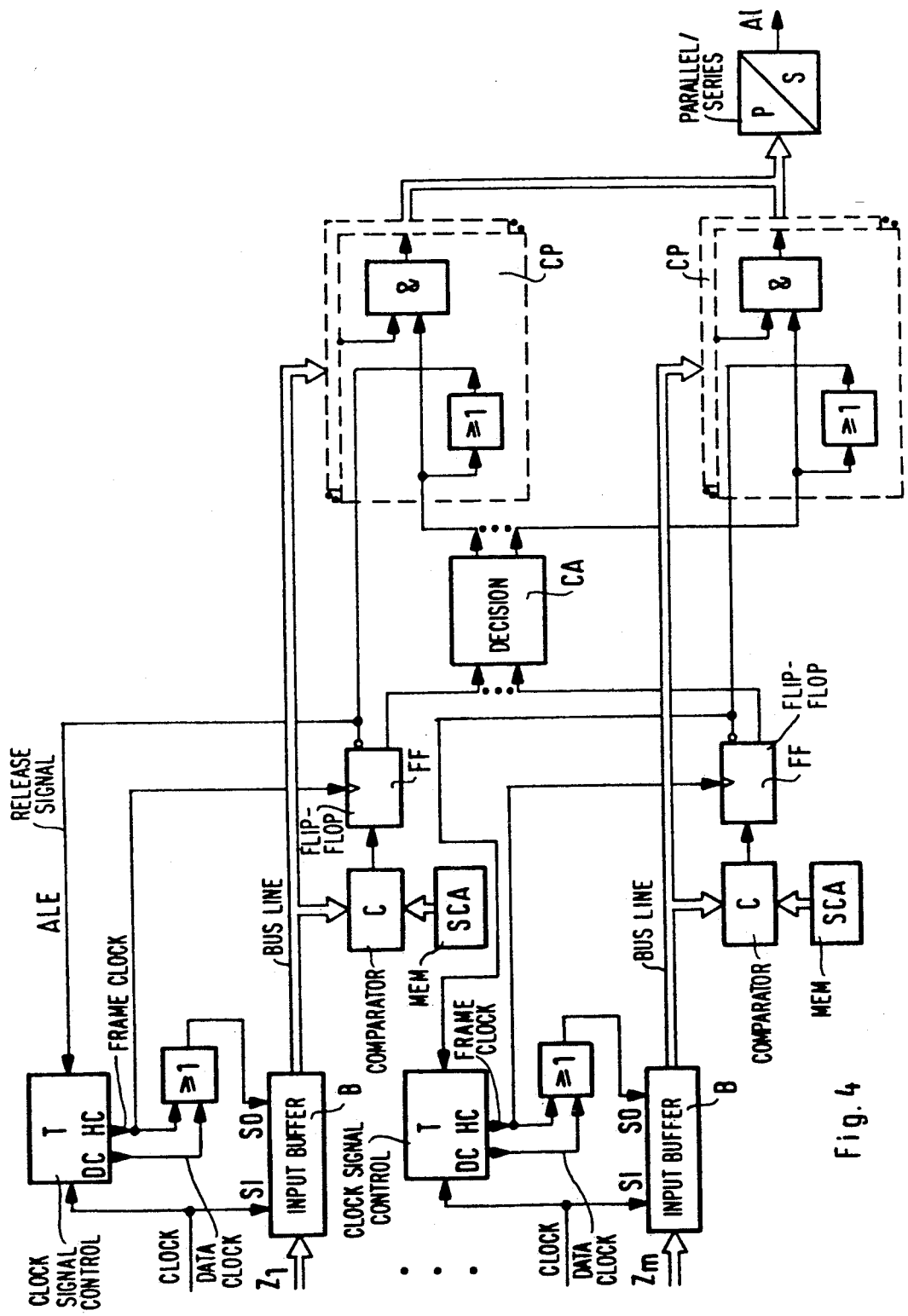
Figure 5:
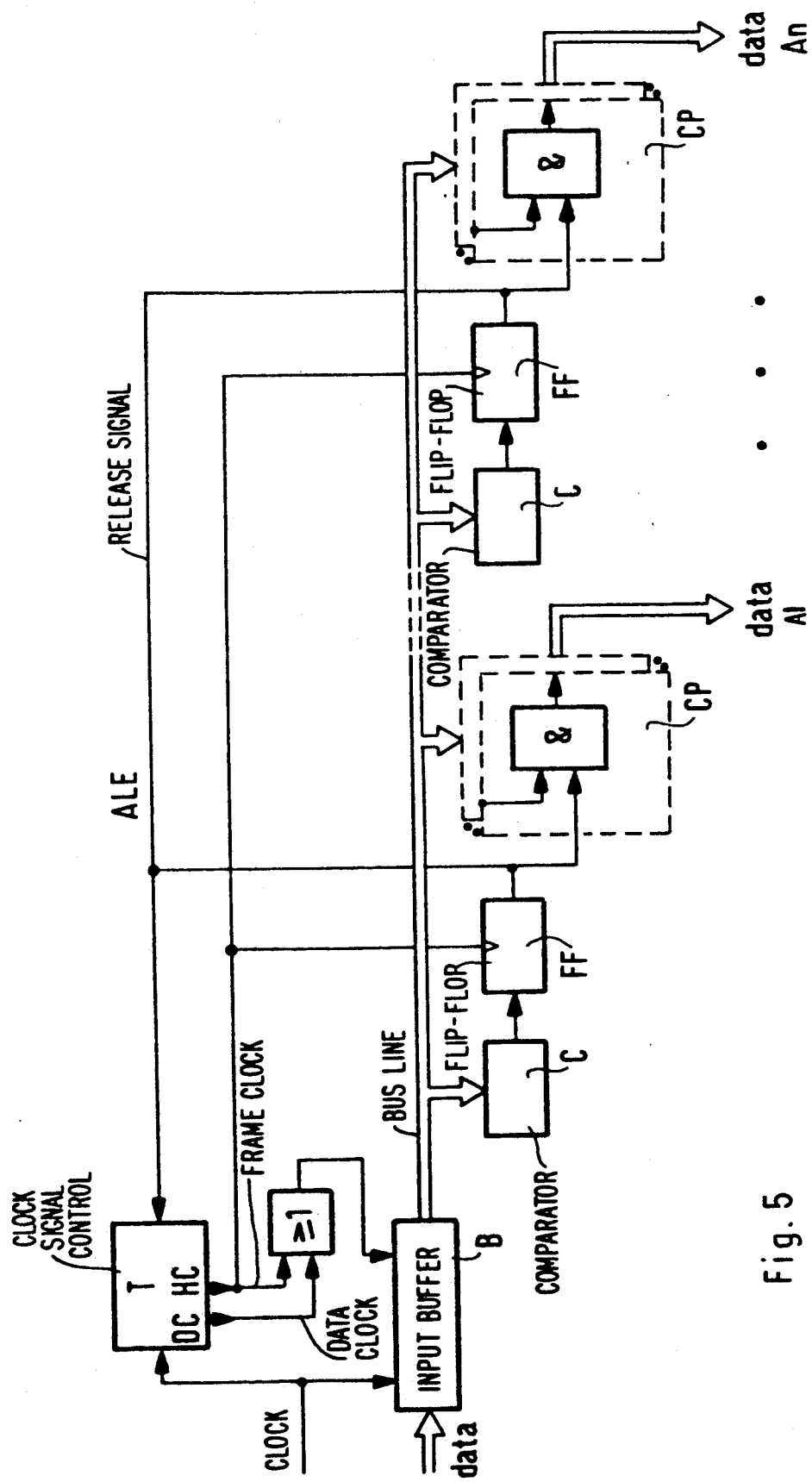

FIG. 2a and FIG. 2b show for comparison the allocation of input buffers and switching network as shown in FIG. 1 and FIG. 3, FIG. 3 shows an embodiment for a switching network having switching network buffering, FIG. 4 shows a further embodiment for a switching network having switching network buffering and FIG. 5 shows a further embodiment for a switching network having input buffering when a deconcentrator is used.

The embodiments for switching networks having an expansion stage (deconcentrator) as shown in the FIGS. 1 and 2a have already been extensively discussed. These switching networks can be built up of identical structural elements BE so that the switching network is segmented "column-by-column". The data of the supply lines Z are preferably offered to all units BE in parallel with a bus-like cabling (see FIG. 3). The transfer from the supplyline Z to the bus-like cabling is performed by interface circuits JM.

Each interface circuit JM comprises besides functions for a serial-to-parallel conversion of the data El-Em, a buffer circuit P with which all incoming data are synchronised with a header. The interface circuit JM and structural elements BE are preferably designed as plug-in cards for a back wall wiring, with which the bus-like cabling can be realised in a very advantageous way.

FIG. 4 shows for a switching network with switching network buffering (structural component having input buffering) a switching network control, in which the function of the circuit components used was already extensively discussed with reference to FIG. 1. In the highway system arranged in the way of a space-division multiplex switching network a number of input buffers B corresponding with the number of trunk lines (A) are connected to each supply line Z, in which buffers the supplied blocks are temporarily stored. To the bus line on the output side of an input buffer B is connected a comparator C assigned to the switching point, which comparator compares to the routing information the addresses of the trunk lines A arranged column-by-column and stored in the memory SCA. In the case of multiple correspondence the decision circuit CA, connected both to the comparators C and to the switching points CP, determines the order of the supply lines Z arranged line-by-line which have to be switched through.

Each comparator C is connected to a flipflop FF to whose inverting output the switching point CP and to whose non-inverting output the decision circuit CA is connected.

After the evaluation of the routing information by the comparator three cases are to be distinguished:

1. The block $P_{1k}$ is intended for the trunk line $A_1$ and the trunk line $A_1$ is assigned thereto by the decision circuit CA. In this case the switching point CP switches and the block $P_{1k}$ is read from the input buffer B (triggering of line ALE).

2. The block $P_{1k}$ is intended for the trunk line $A_1$ and the line $A_1$ has not yet been assigned thereto by the decision circuit CA. This is a condition of queueing until the trunk line $A_1$ is assigned (compare 1).

3. The block $P_{1k}$ is not intended for the trunk line $A_1$. There is no signal from the decision circuit CA. The line ALE is triggered via the inverting output of the flipflop FF. The block $P_{1k}$ is read out but does not reach the trunk line $A_1$ via the switching point CP.

The decision circuits of the FIGS. 3 and 4 define a declining priority of the supply lines 1, 2, ... with buffers that are not empty.

In order not to implement the decision algorithm in an unfair way, this establishing of priorities should be different for each structural element BE, roughly in the following way:

| Trunk line | Declining priority of the supply lines |
|---|---|
| 1 | 1, 2, 3, ... |
| 2 | 2, 3, 4, ... |
| 3 | 3, 4, 5, ... |

A structural element BE can be advantageously used as a concentrator: it then causes the data streams of m lines to be concentrated on one line. For deconcentration a further componet is then used, which is represented in FIG. 5. It allows to transfer the data coming from a supply line Z to n trunk lines A according to their routing information: This corresponds with the function of a demultiplexer.

Since no access conflict can occur, the decision circuit CA is cancelled. The components from FIG. 3 can also operate as a statistical multiplexer: In this case the comparator C is to show that one block anyhow is available in the supply line Z concerned.

What is claimed is:

1. An asynchronous time-division switching network, in which network, blocks which include headers and data are routed to trunk lines (A1 ... An) from supply lines (E1 ... Em), based on routing information in the headers, the network comprising:
   a) a global clock source;
   b) a first number of interface units, which first number is equal to a number of supply lines, each interface unit including
      i) input means for receiving blocks as serial data;
      ii) means for converting at least a portion of the serial data in a block to parallel form;
      iii) means for providing a frame clock;
      iv) means, coupled to the global clock source, for elastically buffering the parallel form under control of the frame clock; and
      v) means for outputting contents of the means for elastically buffering to an associated internal supply bus (Z1 ... Zm) in parallel, frame-synchronized form;
   c) the first number of the associated internal supply buses; and
   d) a second number of concentrators, each for switching data from a respective plurality of the internal supply buses to a respective one of the trunk lines, which second number is equal to a number of the trunk lines, each concentrator comprising
      i) the first number of input buffers for receiving blocks from associated ones of the respective plurality of internal supply buses in a form in which at least a portion of each block is in parallel;
      ii) the first number of means for comparing routing information in respective ones of the input buffers with an address of the single trunk line;
      iii) a decision circuit for determining an order of transfer of data from the internal supply buses to the respective trunk line, based upon results produced by the means for comparing;
      iv) a multiplicity of junction points, so that when the decision circuit determines transfer from a given supply bus, bits, that are stored in parallel in the input buffer associated with the associated internal supply bus, are transferred in parallel from the input buffer to an internal trunk bus; and
      v) means, having an output coupled with the single trunk line, for converting data on the internal trunk bus from parallel to series for transmission to a respective trunk line.

2. The network of claim 1 further comprising the first number of flip-flops, each associated with a respective supply bus, coupled between the means for comparing and the decision circuit, each flip flop having an output coupled to release data in the associated input buffer when the results produced by the means for comparing indicate that the contents of the buffer are not to be transferred to the single trunk line.

3. An asynchronous time-division switching network, in which network, blocks which include headers and data are routed to trunk lines (A1 ... An) from supply lines (E1 ... Em), based on routing information in the headers, comprising:
   a) a global clock source;
   b) a first number of interface units, which first number is equal to a number of supply lines, each interface unit including
      i) input means for receiving blocks as serial data;
      ii) means for converting at least a portion of the serial data in a block to parallel form;
      iii) means for providing a frame clock;
      iv) means, coupled to the global clock source, for elastically buffering the parallel form under control of the frame clock; and
      v) means for outputting contents of the means for elastically buffering to an associated internal supply bus (Z1 ... Zm) in parallel, frame-synchronized form;
   c) the first number of the associated internal supply buses; and
   d) the first number of deconcentrators, each for distributing data from a respective one of the internal supply buses to a respective plurality of internal trunk buses, each deconcentrator comprising
      i) an input buffer for receiving blocks from the respective supply bus in a form in which at least some of the bits from each block are in parallel;
      ii) a plurality of comparators, one associated with each internal trunk bus, for comparing routing information in the input buffer with an address of the trunk bus associated with that internal trunk bus; and
      iii) a multiplicity of junction points, such that there is a junction point for each bit of each internal trunk bus, and so that when one of the comparators detects an address match, bits which are stored in parallel in the input buffer are transferred in parallel to the associated trunk bus.

* * * * *